Figure 1:
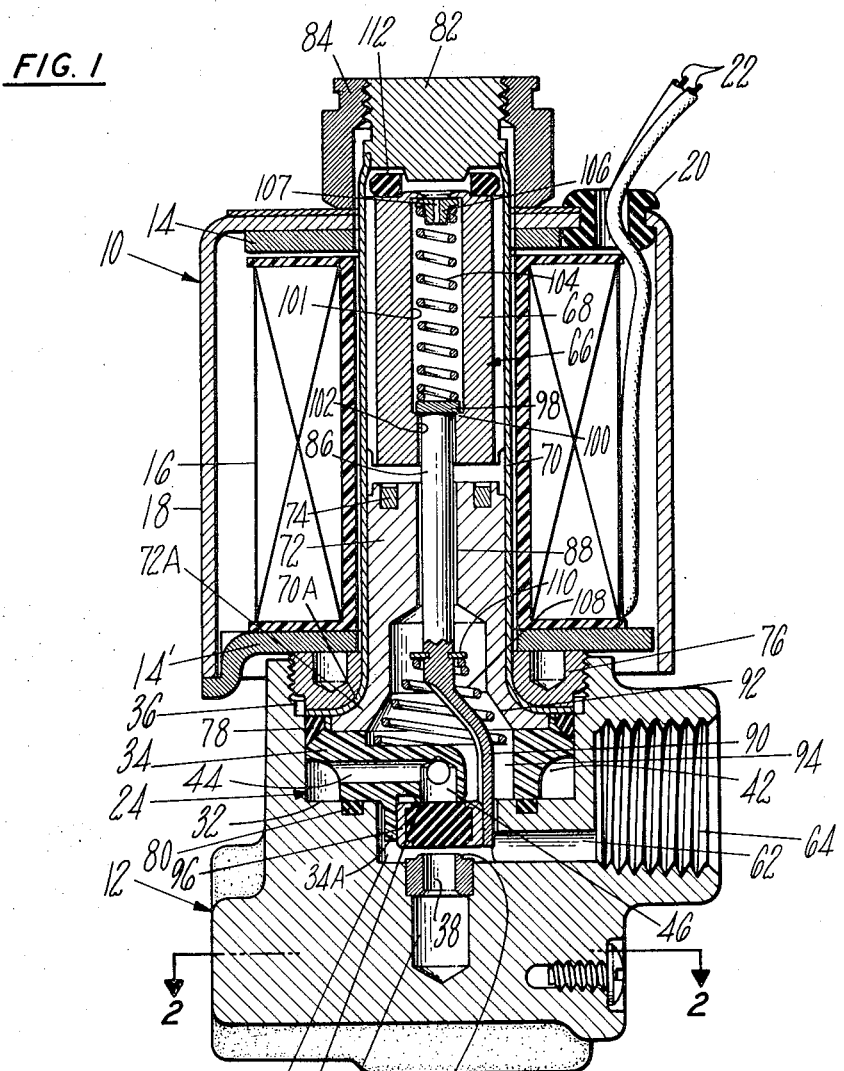

United States Patent [19]
Ellison et al.

[11] 3,707,992
[45] Jan. 2, 1973

[54] ELECTROMAGNETIC VALVE ASSEMBLY

[75] Inventors: John E. Ellison, Newington; Herbert M. Flink, East Hartford, both of Conn.

[73] Assignee: Skinner Precision Industries, Inc., New Britain, Conn.

[22] Filed: Nov. 9, 1970

[21] Appl. No.: 87,679

[52] U.S. Cl. ............137/625.65, 251/129, 251/282
[51] Int. Cl. .........................................F06k
[58] Field of Search.......137/625.65, 625.26, 625.27, 137/625.25, 505.44, 454.6, 495; 251/141, 129, 282

[56] References Cited

UNITED STATES PATENTS

| | | | |
|---|---|---|---|
| 2,612,907 | 10/1952 | Harris | 251/129 |
| 2,826,215 | 3/1958 | Wolfslau et al. | 251/282 X |
| 3,303,854 | 2/1967 | Churchill | 137/625.65 |
| 2,040,964 | 5/1936 | Tarleton | 251/129 |

FOREIGN PATENTS OR APPLICATIONS 1,031,597  6/1958  Germany.........................137/625.27

*Primary Examiner*—Henry T. Klinksiek
*Assistant Examiner*—Robert J. Miller
*Attorney*—Prutzman, Hayes, Kalb & Chilton

[57] ABSTRACT

An all ports in body valve assembly wherein a reciprocable solenoid armature is received within a guide sleeve mounted on a body and a spring is drivingly connected between the armature and a rod carrying a valve member for sealing engagement with a valve seat in an arrangement wherein both the guide sleeve and valve member are isolated from armature impact forces upon energization. The valve seat is formed in an insert fitted in the body, and the insert provides fluid passages for communicating with ports formed in the body. An illustrative embodiment of the rod includes a terminal portion radially offset relative to the axis of movement of the armature and to the valve seat providing a valve assembly particularly suited for a three-way valve featuring an all ports in body construction.

16 Claims, 2 Drawing Figures

PATENTED JAN 2 1973

3,707,992

INVENTORS
JOHN E. ELLISON
HERBERT M. FLINK

BY Prutzman, Hayes, Kalb and Chilton
ATTORNEYS

ELECTROMAGNETIC VALVE ASSEMBLY

This invention generally relates to fluid control valves and particularly concerns solenoid valve operators having a reciprocal plunger assembly for controlling fluid flow.

A primary object of this invention is to provide a new and improved solenoid valve operator having a plunger assembly particularly suited to cooperate with a fluid porting and flow arrangement within a valve body to effect simplified manufacture and assembly.

Another object of this invention is to provide a new and improved solenoid valve operator having a magnetic circuit exhibiting increased efficiency and reliability of operation for applications having relatively large capacity flow rates and highly responsive control requirements.

A further object of this invention is to provide a new and improved valve operator of the above-described type wherein a guide sleeve is provided for the plunger assembly and which is readily secured in aligned relation thereto and to a stop member for minimizing armature "buzzing" or chatter as commonly encountered in valve operators of the alternating current type upon energizing the solenoid.

Still another object of this invention is to provide a new and improved valve assembly wherein armature energization impact is transmitted to a relatively large mass of the valve body in an arrangement particularly suited to relatively isolate the sealing or valve member and the plunger guide sleeve from such energization impact while permitting a desired thin wall sleeve construction and repeated operation over a long period of time without malfunction regardless of the pressure of the fluid being controlled.

A still further object of this invention is to provide a new and improved solenoid valve assembly wherein seemingly incompatible design objectives of relatively high capacity, high pressure, fluid flow and large end contact areas for magnetic attraction of an armature are achieved in a compact valve providing an efficient combination of mechanical and electrical functions and which is further characterized by a flexible design adapted to be modified to provide various arrangements of porting, mounting, flow control and electrical requirements to meet a wide variety of different applications.

Other objects will be in part obvious and in part pointed out in more detail hereinafter.

A better understanding of the objects, advantages, features, properties and relationships of this invention will be obtained from the following detailed description and accompanying drawing which set forth in illustrative embodiment and are indicative of the various ways in which the principle of the invention is employed.

Figure 2:
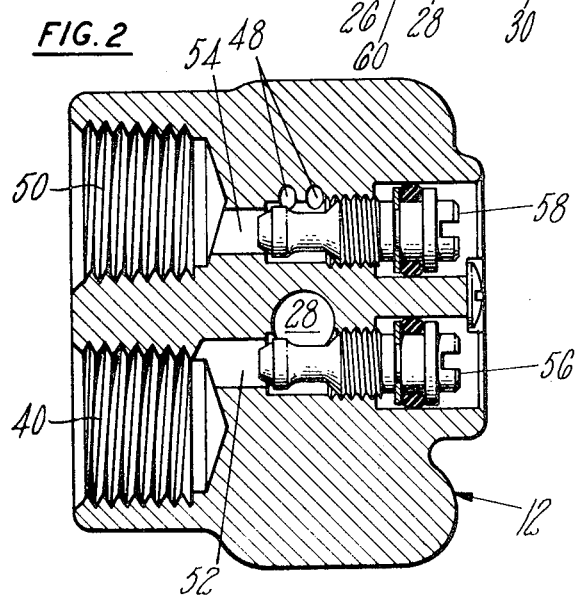

In the drawing:

FIG. 1 is a sectional view, partly broken away, showing a solenoid valve assembly incorporating this invention; and FIG. 2 is a sectional view taken generally along line 2—2 of FIG. 1.

Referring to the drawing, a fluid control valve assembly is shown incorporating a preferred embodiment of this invention and having a valve operator generally designated 10 supported on a body 12. The operator 10 has upper and lower magnetic flux conducting plates 14, 14' disposed at opposite ends of an electromagnetic solenoid coil 16 which is mounted on the lower plate 14' and enclosed in an external flux conducting housing 18. The specific illustrated embodiment is shown for illustrative purposes as being suitably apertured to receive grommets (only one shown at 20) through which extend lead wires 22, 22 for the coil 16. The body 12 has a central valve chamber 24 including a lower compartment 26 communicating with an axial passage 28 extending downwardly through a valve seat 30 in the lower compartment 26, an enlarged middle compartment 32 in which a generally disklike orifice capsule or insert 34 is received, and a further enlarged upper compartment 36.

For purposes of this description, the valve assembly will be understood to be of a three-way, normally closed type, and an exhaust orifice 38 defined by the valve seat 30 is shown in continuous communication with a normally open exhaust port 40. To provide a valve assembly wherein all porting and necessary connecting passages are formed exclusively in the body in a so-called all ports in body construction, which is quick and easy to manufacture and assembly with a minimum number of different parts, the orifice insert 34 is fitted into the middle valve chamber compartment 32 and is formed with an arcuate lower side wall of reduced diameter which is in spaced relation to a surrounding annular wall of the middle compartment 32 to define an annulus 42 which connects through a communicating radial passage 44 with an interior central supply orifice 46 formed in the insert 34. The annulus 42 also connects through a pair of vertically drilled passages 48, 48 in the body 12 to a normally closed inlet port 50 which will be understood to be connected to a source of pressurized fluid, not shown. The ports 40, 50 are shown having suitable connecting passages 52, 54 respectively leading to axial passage 28 and passages 48, 48 via adjustable metering elements 56, 58 suitably mounted in the body 12.

The fluid media flows from the annulus 42 through the radial passage 44 to the central supply orifice 46 of the insert 34, which provides a valve seat 60, upon the orifice 46 being connected to a radially directed common supply and exhaust passage 62. The latter communicates the lower compartment 26 with a working cylinder port 64, e.g., for controlling the position of a piston in a working cylinder, not shown.

When the valve operator 10 is employed as described in connection with a working cylinder, fast, sensitive response is frequently required with consequent demand for high speed fluid supply to and exhaust from the working cylinder port 64 and communicating common passage 62. Quick supply and exhaust of high pressure fluid has often been difficult to achieve in fluid control valve operators of the type which provide for fluid flow through or past a solenoid pole piece and the plunger. Since it is desired to maintain a relatively large end area of the pole piece intact for magnetic attraction of the plunger, particularly under high pressure and/or flow rate requirements, any sizable fluid passage past or through the pole piece and plunger severely limits their available end area.

Increased operating efficiency of the solenoid of this invention is achieved by the provision of a substantially symmetrical magnetic circuit of improved magnetic flux linkage for magnetically operating a plunger assembly 66 retained in a guide sleeve which is quick and easy to secure in alignment with the plunger assembly and an associated stop member. The disclosed construction additionally minimizes any undesirable tendency toward plunger chatter while at the same time eliminating any need for fluid flow past an upper end of the plunger assembly 66, thereby to accommodate higher pressure or flow ratings while eliminating any tendency of the plunger being inadvertently moved out of position under the influence of high pressure fluid flow.

More specifically, the plunger assembly 66 includes a generally cylindrical armature 68 longitudinally reciprocal within an upper end portion of a fixed nonmagnetic guide sleeve 70, for movement toward and away from a stop member 72 of magnetic material fixed concentrically within the guide sleeve 70 below the armature 68. While the upper end of the stop member 72 is shown provided with the usual A.C. shading ring 74, it will be understood that the valve assembly of this invention is suitable for D.C. applications.

To provide economical manufacture and assembly free of the usual installation and maintenance problems associated with conventional valves of this general type, both the guide sleeve 70 and the stop member 72 are formed with conforming radially outwardly flared lower end portions 70A and 72A which are removably secured coaxially of the coil 16 in the upper compartment 36 of the body 12 in stacked relation to the insert 34. An externally threaded retaining nut 76 formed of suitable flux conducting material is attached to the body 12 in clamping engagement with the flared lower end portion 70A of the guide sleeve 70 which engages the stop member 72 interposed between the guide sleeve 70 and the insert 34. Insert 34 is secured in a fluidtight condition within the body 12 by O-ring seals 78, 80 between the body 12 and upper and lower portions of the insert 34. Accordingly, armature 68 is received within the guide sleeve 70 in precisely aligned relation to the guide sleeve and the stop member; and full surface contact engagement between the armature 68 and stop member 72 is enhanced and minimal cocking or misalignment will occur to minimize any undesired chatter caused by the armature 68 failing to seat against the full end area of the pole piece provided by the stop member 72, even if the upper end of the guide sleeve 70 is welded to a top closure or plug 82, as illustrated. A nut 84 is shown threadably secured to the plug 82 for fixing the housing 18 in assembled relation to the body 12. By virtue of this arrangement, both the armature 68 and stop member 72 may be quickly and easily removed from guide sleeve 70 if required, e.g., to repair the mating surfaces to eliminate chatter. Such ready disassembly is facilitated by reducing the adjacent end area diameters of the armature 68 and stop member 72 to prevent their being peened into fixed interference with guide sleeve 70.

To accommodate the aforementioned all ports in body construction and to further ensure improved mating contact between the armature 68 and stop member 72, the plunger assembly 66 additionally includes an elongated actuating or sealing rod 86 slidably received in the armature 68 to extend downwardly through an axial opening 88 in the stop member 72. Rod 86 has a lower contoured portion 90 radially offset from the longitudinal axis of the armature 68 and received in an enlarged lower cavity 92 of the stop member 72 overlying the insert 34. The radially offset rod portion 90 extends downwardly through an opening 94 in the insert 34 to a point below its valve seat 60 and carries a valve member 96 for effecting desired valving action upon being alternately seated on the valve seats 30, 60. To ensure repeatable concentric seating of the valve member 96 on valve seats 30 and 60, suitable guide fingers, only one shown at 34A, are illustrated as being integrally formed on the insert 34 to project downwardly in spaced apart relation around the valve member 96.

Above the upper end of the sealing rod 86 is a separate, radially enlarged disk 98 providing a spring seat normally abutting an internal shoulder 100. Shoulder 100 is formed within the armature 68 by a spring chamber 101 of enlarged diameter relative to an axial armature opening 102 receiving the sealing rod 86, the spring chamber 101 and the opening 102 being in aligned concentric relation to the longitudinal axis of the armature 68. The disk 98 is continuously urged into engagement with the armature shoulder 100 by a coil compression armature spring 104. Spring 104 has one end seated against the disk 98 and an opposite end seated against an end plug 106 shown suitably secured in the axial opening 102 of the armature 68. To ensure proper operation despite the entry of fluid media into spring chamber 101, an axial hole 107 is preferably formed in end plug 106 for venting the spring chamber 101.

Upon energizing the solenoid coil 16, the plunger assembly 66 shifts downwardly causing compression of a seal assembly return spring 108 which exerts a spring force on the sealing rod 86 less than that of the opposing armature spring 104. Return spring 108 is shown coiled about the radially offset portion 90 of the rod 86 and seated between a retaining ring 110 fixed to the rod 86 and the insert 34 secured within the body 12. More specifically, upon the armature 68 being attracted downwardly toward the stop member 72 which establishes a lower limit position for the armature 68, the armature spring 104 transmits a driving force to the sealing rod 86, which in turn is driven downwardly against the force of the return spring 108 to unseat the valve member 96. This action opens the supply orifice 46 to the cylinder port 64, and moves the valve member 96 a distance less than the full movement of the armature 68 and with significantly reduced impact into sealing engagement with the opposite valve seat 30 to close the exhaust orifice 38 while the solenoid coil 16 remains energized. In this position, the armature spring 104 is slightly compressed, taking up axial tolerances and further ensuring full surface mating engagement between the armature 68 and stop member 72.

It will be noted that upon energization, the guide sleeve 70 is substantially free of any impact forces normally imposed thereon in conventional valve assemblies upon movement of a solenoid operated armature. In the specifically illustrated embodiment, upon energization, impact forces are imposed almost entirely on the fixed stop member 72 and transmitted through insert 34 to the body 12. The valve member 96 is protected from such impact by the deflection of armature spring 104. Valve member 96 thus absorbs only slightly more impact than that effected by movement of the relatively small mass of itself and the sealing rod 86 carrying the valve member 96. Such limited low impact on the valve member 96 aids significantly in ensuring long life of repeated operations.

Upon deenergizing the solenoid coil 16, the compressed armature spring 104 urges the armature 68 upwardly toward engagement with a snubber or pad 112 formed of suitable impact absorbing material, such as synthetic rubber, fitted between the upper end of the armature 68 and the top plug 82 of the sleeve 70 for reducing the lighter deenergization armature impact stress on the sleeve 70. The pad 112 establishes an upper limit position for the armature 68. Upward movement of the armature 68 eliminates the armature spring loading on the sealing rod 86 permitting its return under the influence of the compressed return spring 108 to an extent limited by engagement of the valve member 96 with the valve seat 30.

Quick and positive return of the sealing rod 86 to its illustrated normal position is thus effected concurrently with the return of the armature 68, regardless of the mounting position of the valve assembly, while additionally overcoming any possible undesired effect of residual magnetism of the solenoid coil 16. Upon shifting of the rod 86, the valve member 96 opens the exhaust orifice 38 to the cylinder port 64 and closes the connecting common supply and exhaust passage 62 to the supply orifice 46.

By virtue of the above-described construction, no need exists for any fluid flow past the upper end of the plunger assembly 66 and out through the sleeve 70, thereby eliminating the normally encountered orifice restrictions and pressure rating limitations frequently provided by valves of the type having a flow path to an orifice through the center of the solenoid coil. The disclosed plunger assembly 66 wherein the axis of movement of the armature 68 is coincident with the longitudinal axes of the springs 104, 108 and the solenoid coil 16 provides for economy of manufacture and assembly while the springs 104, 108 are provided with a sufficient number of turns to preclude undesired twisting of the sealing rod 86. Due to the disclosed construction wherein armature impact on the sleeve 70 is essentially eliminated during energization and minimized upon deenergization, the wall of the sleeve 70 may be desirably formed of reduced thickness to provide improved magnetic flux linkage between the flux conducting portions of the armature 68 and stop member 72 adjacent the plates 14, 14' for more efficient solenoid actuation while et minimizing any malfunction due to breakage of the sleeve itself.

As will be apparent to those skilled in the art, various modifications may be made to the above-described valve design to provide different arrangements of porting, mounting, flow control and electrical requirements to meet a wide variety of different applications. For example, the elimination of any media flow out through the sleeve 70 makes it possible for the operator 10 to be easily modified to provide a manual override feature of exceedingly simple construction at the top of the operator 10 wherein a push button, not shown, may be mounted at the top of the sleeve to effect selective manual actuation of the plunger assembly 66. In addition, the return spring 108 may be selected with a slightly reduced spring force, and the normally open port 40 may be connected to a source of pressurized fluid while normally closed port 50 is connected to exhaust fluid from the valve body 12 to provide a three-way normally open valve. Other mounting, porting and flow arrangements may also be provided, if desired, e.g., to provide a two-way, normally open or normally closed valve.

A valve assembly made in accordance with this invention significantly reduces any transmission of armature impacting forces to the sleeve during operation to permit the nonmagnetic guide sleeve to be constructed with a reduced wall thickness for improved magnetic flux linkage, which when coupled with the all ports in body construction provides for a valve assembly particularly suited to provide increased flow rates and improved electrical efficiency for highly responsive, reliable operation.

As will be apparent to persons skilled in the art, various modifications, adaptations and variations of the foregoing specific disclosure can be made without departing from the teachings of the present invention.

We claim:

1. A solenoid valve assembly comprising a body, fluid passage means in the body including a valve chamber, first and second valve seats disposed in the valve chamber, an actuating rod having a valve member integrally mounted thereon and movable in opposite axial directions for alternative sealing engagement with the first and second valve seats for selectively controlling fluid flow through the passage means, a resilient means urging the actuating rod one of said directions, an armature reciprocable generally along the longitudinal axis of the rod and receiving an end portion of the rod for relative movement therein, a solenoid coil disposed about the armature for moving the armature, a spring providing a resilient driving connection between the actuating rod and the armature for moving the actuating rod against the force of the resilient means upon energization of the solenoid coil, and stop means supported on the body establishing first and second limit positions limiting armature movement to a preselected linear displacement, the first and second valve seats limiting movement of the actuating rod in opposite directions to a distance less than said preselected linear displacement of the armature, and the spring providing said resilient driving connection being deflected by armature movement upon energization of the coil while permitting overtravel of the armature relative to the actuating rod in its opposite directions of movement whereby, upon the armature being arrested in its opposite directions of movement, the valve member is isolated from the armature impact forces imposed on the body.

2. The valve assembly of claim 1 wherein the stop means includes a stop member supported on the body and positioned intermediate the valve member and the armature, the armature and the stop member having concentric axial openings for receiving the actuating rod, and wherein said spring is seated within the axial opening in the armature for urging the actuating rod against the force of the resilient means.

3. The valve assembly of claim 1 further including an armature guide sleeve concentrically interposed between the armature and the solenoid coil with the armature received for reciprocation within the guide sleeve, the stop means including an armature stop member formed of magnetic material and coaxially received within the guide sleeve, the guide sleeve having an open end supported on an end portion of the stop member, the end portion of the stop member being supported on the body, and fastening means removably secured to the body in overlying engagement with the open end of the guide sleeve for removably clamping the guide sleeve and the stop member in concentric aligned relation to one another and in assembled relation to the body while permitting quick and easy disassembly of the armature and stop member from the guide sleeve.

4. A solenoid valve assembly comprising a body, fluid passage means in the body including a valve chamber, movable plunger means including an elongated rod reciprocable in opposite linear directions along a longitudinal axis of the rod, the rod having a portion received in the valve chamber in radial offset relation to the longitudinal axis of the rod, a valve seat disposed in the valve chamber adjacent the offset portion of the rod and in alignment with its longitudinal axis, a valve member carried by the radial offset portion of the rod for sealing engagement with the valve seat for controlling fluid flow through the passage means, a spring urging the rod in one linear direction, a solenoid coil disposed about the plunger means to effect movement of the rod in the opposite linear direction against the force of the spring, a guide sleeve supported on the body coaxially within the solenoid coil, the plunger means including a generally cylindrical armature coaxially received in the guide sleeve for longitudinal reciprocation, the rod having an end portion coaxially received within the armature, and a driving connection between the armature and the rod.

5. A solenoid valve assembly comprising a body, fluid passage means in the body including a valve chamber, movable plunger means including an elongated rod reciprocable in opposite linear directions along a longitudinal axis of the rod, the rod having a portion received in the valve chamber in radial offset relation to the longitudinal axis of the rod, a valve seat disposed in the valve chamber adjacent the offset portion of the rod and in alignment with its longitudinal axis, a valve member carried by the radial offset portion of the rod for sealing engagement with the valve seat for controlling fluid flow through the passage means, a spring urging the rod in one linear direction, a solenoid coil disposed about the plunger means to effect movement of the rod in the opposite linear direction against the force of the spring, an insert received within the valve chamber and providing fluid passage means including said valve seat which is formed in the insert, a generally cylindrical stop member supported on the body for limiting longitudinal movement of the plunger means in said opposite linear direction, a guide sleeve received within the solenoid coil in surrounding concentric relation to the top member and the plunger means, the rod being received for reciprocable sliding movement within the stop member, and means for clamping the guide sleeve, the stop member and the insert to the body in fixed coaxial relation to the solenoid coil.

6. A solenoid valve assembly comprising a body, fluid passage means in the body including a valve chamber, movable plunger means including an elongated rod reciprocable in opposite linear directions along a longitudinal axis of the rod, the rod having a portion received in the valve chamber in radial offset relation to the longitudinal axis of the rod, a valve seat disposed in the valve chamber adjacent the offset portion of the rod and in alignment with its longitudinal axis, a valve member carried by the radial offset portion of the rod for sealing engagement with the valve seat for controlling fluid flow through the passage means, a spring urging the rod in one linear direction, and a solenoid coil disposed about the plunger means to effect movement of the rod in the opposite linear direction against the force of the spring, the plunger means including an armature reciprocable generally along the longitudinal axis of the rod, the armature having an opening for receiving an end portion of the rod for relative movement therein, stop means supported on the body establishing first and second armature positions limiting its movement, means for limiting the valve member movement to a distance less than the full armature movement, and a second spring received within the armature opening and seated between the armature and said end portion of the rod providing a driving connection therebetween whereby, upon movement of the armature being arrested, the valve member is relatively isolated from the armature impact forces which are imposed on the body.

7. The valve assembly of claim 4 wherein a stop member is coaxially received within the guide sleeve intermediate the valve member and the armature, the stop member having an axially extending opening therethrough receiving the rod for reciprocable movement.

8. The valve assembly of claim 5 wherein the insert includes an opening therethrough in laterally offset relation to the longitudinal axis of the rod and through which opening the offset portion of the rod extends, and wherein the valve seat is formed in coaxial relation to the solenoid coil on a face of the insert remote from the solenoid coil and disposed in the valve chamber intermediate the ends of the rod.

9. The valve assembly of claim 7 wherein the guide sleeve and the stop member have conforming radially outwardly flared end portions in clamped, removable assembly with the body.

10. The valve assembly of claim 7 wherein the stop member includes an end serving as a solenoid pole piece adjacent the armature and defining a stop therefor, the stop member having an axial opening extending through said one end for receiving the rod and a communicating enlarged cavity at the other end of the stop member jointly serving with the body to define the valve chamber.

11. A valve assembly comprising a body having a valve chamber and first and second ports formed in the body in communication with the valve chamber, an insert disposed within the valve chamber and providing fluid passage means for connection with at least one of the ports, the fluid passage means including an orifice and surrounding valve seat formed in the insert, a valve member supported for movement toward and away from the valve seat for controlling fluid flow, valve operating means connected to the valve member and including a solenoid operated armature for moving the valve member, an armature guide sleeve supported on the body, a stop member for the armature, the stop member and the armature being formed of magnetic material and received in coaxial alignment within the guide sleeve, the guide sleeve having an open end supported on an end portion of the stop member, the end portion of the stop member being interposed between the open end of the guide sleeve and the insert, the guide sleeve being of nonmagnetic material, and fastening means removably secured to the body in overlying engagement with said open end of the guide sleeve to removably clamp the guide sleeve, stop member and insert in concentric aligned relation to one another and in releasable assembled relation to the body.

12. The valve assembly of claim 11 wherein the insert is a generally dislike member having a lower side wall portion of reduced diameter providing an annulus in the valve chamber for communication with the first port, wherein the orifice is formed centrally in the insert for communicating with the second port through the valve seat, and wherein a radial passage is formed in the insert connecting the annulus and the central orifice.

13. The valve assembly of claim 11 wherein a third port and a communicating passage including a second valve seat are formed in the body, the second valve seat being in aligned spaced opposed relation to the first valve seat formed in the insert, the valve member being movable into sealing engagement alternately with the first and second valve seats for controlling fluid flow.

14. The valve assembly of claim 11 further including guide means for ensuring repeatable concentric seating of the valve member relative to its valve seat.

15. The valve assembly of claim 11 wherein the clamping forces provided by the fastening means are the sole means for securing the guide sleeve to the body, the insert and the guide sleeve being retained by the fastening means in clamped, stacked relation to the body with the insert in sealing engagement therewith.

16. The valve assembly of claim 11 further including a closure at the opposite end of the guide sleeve, and wherein impact absorbing means is disposed between the armature and the closure.

* * * * *